INVENTOR.
RAOUL P. VAELL

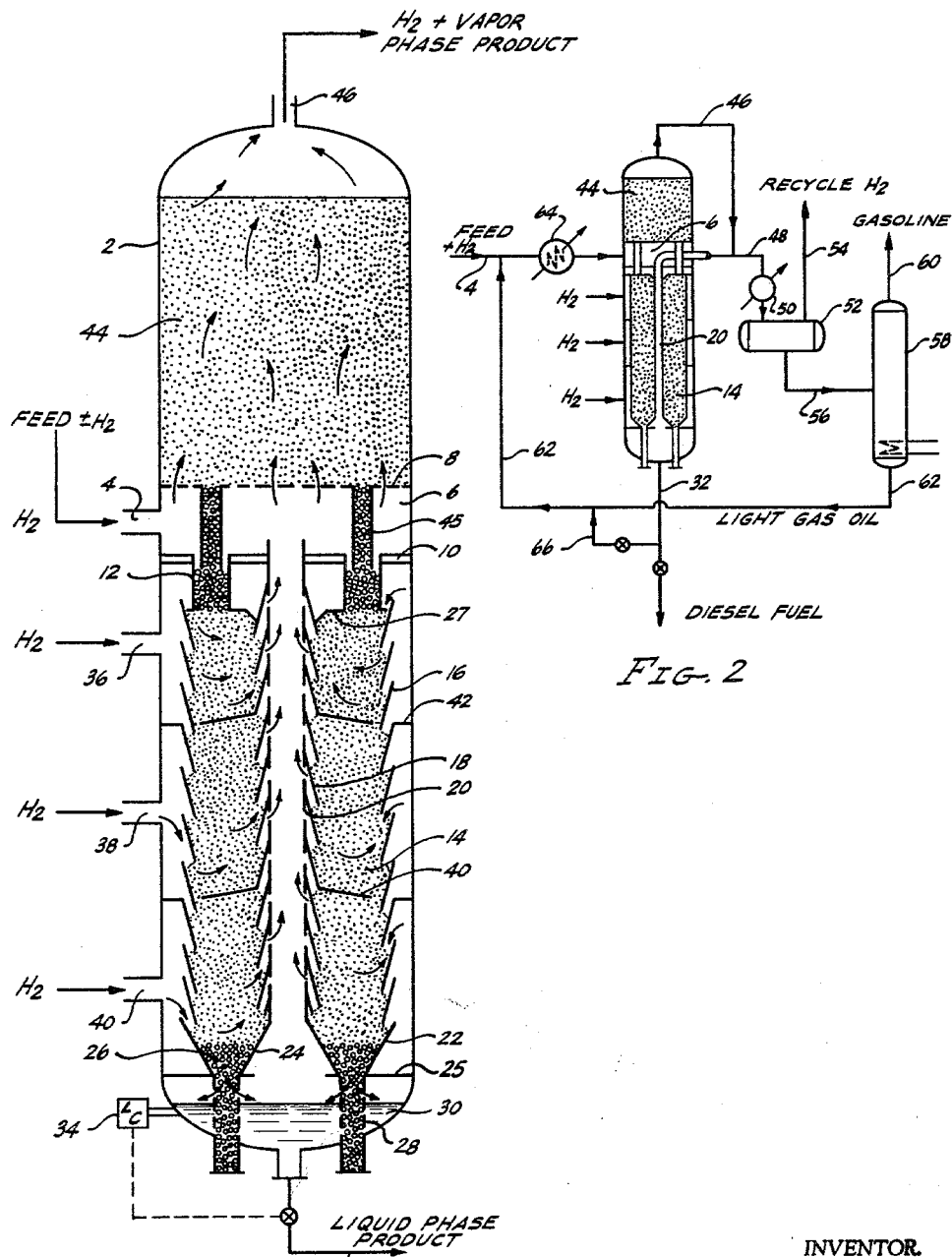

United States Patent Office 3,186,935
Patented June 1, 1965

3,186,935
HYDROGENATION PROCESS AND APPARATUS
Raoul P. Vaell, Los Angeles, Calif., assignor to Union Oil Company of California, Los Angeles, Calif., a corporation of California
Filed Jan. 30, 1962, Ser. No. 169,912
17 Claims. (Cl. 208—59)

This invention relates to the catalytic hydrogenation and/or hydrocracking of hydrocarbons to produce, e.g., hydrogenated aromatics, or lower boiling hydrocarbons, boiling for example in the gasoline or jet fuel range. In broad aspect, the process of this invention involves a novel use of fixed-bed hydrogenation and/or hydrocracking catalysts, wherein a liquid feedstock is allowed to gravitate downwardly through an elongated bed of granular catalyst, while hydrogen is passed through the bed in a direction transverse to the flow of oil, thus sweeping out of the catalyst bed volatile products of hydrogenation and/or hydrocracking, substantially as soon as they are formed. In the case of feedstocks contaminated with organic nitrogen and/or sulfur compounds, volatile catalyst poisons such as ammonia and hydrogen sulfide are swept out of the catalyst bed substantially as soon as they are formed, thus minimizing their poisoning effect upon the catalyst. In hydrocracking processes, low boiling hydrocarbon products are swept out of the bed as they are synthesized, thus minimizing deleterious overcracking.

In one modification of the process as applied to hydrocracking, the vapor phase effluent from the cross-flow reactor, which contains some unconverted hydrocarbons boiling above the gasoline range, is subjected, before or after separation of gasoline, to further hydrocracking in a conventional catalytic hydrocracking zone. According to a still further modification of the process, temperature control is maintained in the cross-flow hydrogenation reactor by segmenting the reactor horizontally into a plurality of separate zones, and supplying a separate hydrogen stream of desired temperature to each zone.

The invention also provides a novel type of apparatus for carrying out the above process. In broad aspect this apparatus comprises a pressure-retaining outer shell enclosing an elongated, annular catalyst container having suitably louvered outer and inner walls arranged so as to retain both the granular catalyst and the downflowing liquid feed, while permitting the flow of hydrogen transversely from the cylindrical outer surface of the catalyst container to the cylindrical inner surface. The vapor phase product is withdrawn through an axially located, vertical, perforated center pipe. Novel means are also provided for redistributing the liquid feed in its downward path through the reactor, and for preventing the channeling of feed therein. Other features of the process and apparatus of this invention will be described in greater detail hereinafter.

In conventional hydrocracking processes, the feedstock in admixture with hydrogen is passed downwardly through a bed of suitable granular hydrocracking catalyst. Product vapors plus unconverted feedstock are withdrawn from the bottom of the reactor. In a typical such operation, where it is desired for example to convert gas oil to gasoline, it will be apparent that some of the desired product gasoline is formed immediately at the top of the catalyst bed, and incremental amounts are formed as the unconverted feed passes downwardly. All of this gasoline save the portion formed in the lowest part of the bed, is necessarily subjected to further undesirable hydrocracking during its downward flow with the unconverted feed. This leads to the problem known as "overcracking," or the cracking of product which has already been reduced to the desired boiling range. The net result is the production of undesirable amounts of butanes and dry gases. This overcracking problem can be minimized by operating the process in several stages, with separation of gasoline product between stages. This, however, leads to considerable added expense. It will be observed further that no solution to this problem is obtained by operating the process with countercurrent flow of feed downwardly and hydrogen upwardly, for the gasoline vapors formed in the lower part of the reactor will then contact the upper part of the catalyst bed. In the process of this invention, the problem of overcracking is minimized in a novel and advantageous manner by continuously removing from the unconverted feed the desired product vapors, and sweeping them out of the catalyst bed in a direction transverse to the downward flow of feed.

Another major difficulty in hydrocracking processes is encountered in connection with feedstocks containing organic nitrogen compounds. These nitrogen compounds are mostly basic in character, and tend to poison the acidic cracking centers of hydrocracking catalysts. To overcome this difficulty, the feedstock is often subjected to a preliminary catalytic hydrofining treatment in order to convert the nitrogen compounds to ammonia, and the product is then condensed and washed to remove the ammonia. The remaining nitrogen-free hydrocarbons are then subjected to hydrocracking. The principal objection to this pretreatment process is that the facilities required for condensing, washing, reheating, and repressuring the hydrofiner effluent, are very expensive.

It has also been proposed to alleviate this problem by operating the hydrocracker with countercurrent flow of feed and hydrogen, the feed passing downwardly and the hydrogen upwardly. This tends to sweep out ammonia as it is formed, and leaves the lower portion of the catalyst bed relatively free of nitrogen. Although this technique can reduce the overall poisoning effect of nitrogen, it is not an ideal solution, because the organic nitrogen compounds do not decompose instantaneously at the top of the catalyst bed, and the decomposition products formed at lower levels in the bed must then pass upwardly, resulting in an even greater concentration of ammonia and undecomposed nitrogen compounds in the upper section of the reactor. This disadvantage is overcome in the process of this invention because, due to the cross-flow of hydrogen with the resultant sweeping out of ammonia transversely, the overall concentration of nitrogen compounds at each horizontal level in the reactor is substantially the concentration resulting from the remaining undecomposed and unvaporized nitrogen compounds present in the feed at that particular level. Thus the poisoning effect of nitrogen compounds is minimized to an even greater extent than that obtainable by countercurrent flow of feed and hydrogen.

In the catalytic hydrogenation of aromatic hydrocarbons, many catalysts and especially the more active ones such as platinum and other noble metals, are sensitive to poisoning by sulfur compounds. Noble metal hydrocracking catalysts may also be sulfur-sensitive in some cases. It is therefore desirable in these cases to remove sulfur compounds as well as nitrogen, from hydrogenation or hydrocracking feedstocks. This may be achieved quite efficiently by catalytic hydrofining, but subject to the same disadvantages previously noted, involving expensive interstage treatments to remove the hydrogen sulfide produced. In the process of this invention, hydrogen sulfide, like ammonia, is continuously swept out of the catalyst bed in a more efficient manner than is provided by the above-mentioned countercurrent flow processing.

From the foregoing, it will be apparent that the principal objective of this invention is to provide convenient means and methods for rapidly removing a desired hydrocracking product from the hydrocracking zone substantially as soon as it is formed, thereby avoiding overcracking. Another objective is to minimize the deleterious effects of volatile catalyst poisons upon hydrogenation or hydrocracking catalysts. A specific object is to obtain the substantial benefits of stage-wise operation in hydrocracking processes without resorting to expensive interstage treatments. A more general objective is to utilize hydrogenation and hydrocracking catalysts at maximum efficiency levels, i.e., at maximum space velocities. Still another object is to provide means and methods for hydrocracking hydrocarbon feedstocks which are contaminated with organic sulfur and/or nitrogen compounds with a minimum of separate pretreatment operations such as hydrofining. Other objects and advantages will be apparent from the more detailed description which follows.

The invention may perhaps be more readily understood with reference to the accompanying drawings, wherein:

FIGURE 1 is a schematic cross-sectional representation of a suitable apparatus for carrying out the process;

FIGURE 2 is a modified schematic alternative to the apparatus of FIGURE 1, combined with a flow diagram illustrating a suitable product recovery and recycle procedure;

Figure 4:
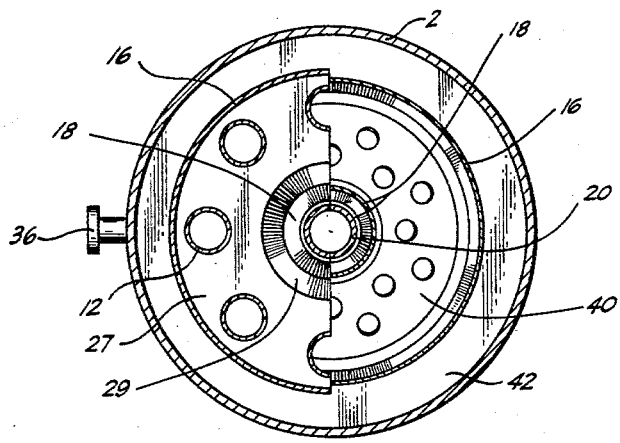
FIGURE 4 is a horizontal cross-section taken along line 4—4 of FIGURE 3.
Figure 5:
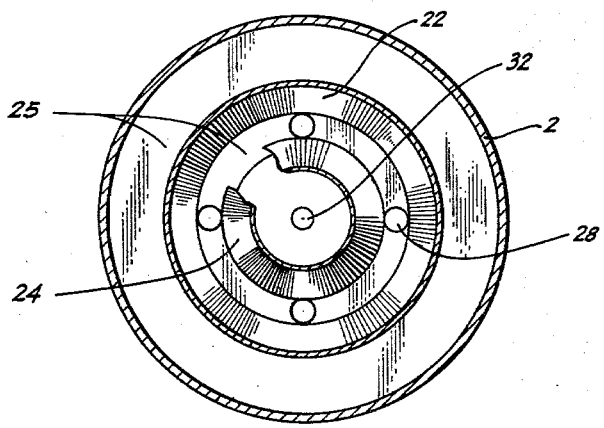
FIGURE 5 is a horizontal cross-section taken along line 5—5 of FIGURE 3.

Referring more particularly to the drawings, FIGURES 1 and 2 will be used to describe the principal process features of the invention, and reference will be made to FIGURES 3, 4 and 5 for further apparatus details. It will be understood throughout that similar reference numerals in the various figures are used to designate the same element. In FIGURE 1, the preheated feed, in admixture with hydrogen if desired, is introduced via inlet conduit 4, into interspace 6 in the mid-section of a conventional, pressure-retaining reactor shell 2 of cylindrical design. Interspace 6 is defined by an upper, circular, perforated plate 8 and a lower, circular supporting pltae 10. The liquid phase portion of feed collects on plate 10 to a depth defined by the upper edge of a plurality of open-ended sealing legs 12 extending upwardly a short distance above plate 10, and being filled with a suitable refractory material such as alundum balls or the like. Liquid overflowing into sealing legs 12 gravitates downwardly through the interestices in the refractory material and enters the top of an elongated annular bed of catalyst 14, where it continues to gravitate downwardly.

The dimensions of catalyst bed 14 constitute a critical aspect of the invention. To obtain the benefits of the novel cross-flow feature, it is necessary that the mean path of the liquid feed through the catalyst bed be substantially longer than the mean path of the transverse hydrogen stream. Accordingly, it is preferred that the length of catalyst bed 14 be at least about twice the thickness thereof. It should be noted also that the terms "cross-flow" or "transverse flow" as used herein are not limited to perpendicular cross-flow, but are intended to cover broadly any flow of hydrogen across the flow path of a liquid feed which deviates substantially from parallel flow.

Catalyst bed 14 is confined at its outer periphery by a series of inverted, overlapping, spaced, concentric frustoconical baffles 16. The inner periphery of catalyst bed 14 is defined by a series of overlapping, upright, spaced, concentric frusto-conical baffles 18, each of which is affixed at its upper extremity, as by weldments, to a perforated center pipe 20. The lower terminus of catalyst bed 14 is defined by an outer, inverted frusto-conical baffle 22, and an inner, concentric upright frusto-conical baffle 24. Baffles 22 and 24 rest upon an annular ring 25, which is supported within reactor shell 2 by means of supporting lugs 23. It will thus be seen that frustoconical baffles 22 and 24 define an included annulus 26 (FIGURE 1) of trapezoidal cross-section, and this annulus communicates downwardly with a plurality of refractory-filled, perforated standpipes 28, which also serve as catalyst drain tubes when it is desired to discharge the catalyst bed and replace it with fresh catalyst. Standpipes 28 are preferably encased in cylindrical screens 31 to retain the granular refractory material and/or catalyst.

The upper terminus of catalyst bed 14 is defined by a ring-shaped baffle 27 having an inverted frusto-conical center portion 29, the inner terminus of which rests against the outer surface of the topmost center baffle 18, forming a substantially fluid-tight seal. The outer portion of baffle 27 is perforated to receive and be supported by the lower ends of sealing legs 12. The outer edge of baffle 27 terminates a short distance inwardly from the topmost outer baffle 16, providing an annular opening for the in-flowing hydrogen. It will thus be apparent that the only paths for hydrogen to follow to reach centerpipe 20, are generally radial through catalyst bed 14.

The liquid feed entering the top of catalyst bed 14 gravitates downwardly, and any unconverted portion collects in the bottom of annulus 26 and flows into standpipes 28 and out through the perforations therein, forming a liquid seal 30 (FIGURE 1) in the bottom of reactor 2. This unconverted liquid is withdrawn via line 32, in response to liquid level controller 34, and may either comprise a desired liquid product, e.g., diesel fuel, or where complete conversion to gasoline is desired, it may be recycled to inlet conduit 4 along with the fresh feed.

Hydrogen for the liquid phase conversion in catalyst bed 14 enters the reactor peripherally through inlet conduits 36, 38 and 40, is distributed in the outer peripheral space surrounding baffles 16, and flows inwardly through the spaces between outer baffles 16, and thence flows transversely through the catalyst bed and into center-pipe 20 through the spaces between inner baffles 18. The inward radial sweep of hydrogen through catalyst bed 14 may tend to sweep the downflowing liquid inwardly toward the center-pipe, and to counteract this tendency, one or more relatively flat, perforated frusto-conical baffles 40 are provided to redirect the liquid feed outwardly toward the incoming hydrogen. Each baffle 40 may be formed integrally with a supporting inner baffle 18, or may be otherwise attached thereto.

It will be noted that in the modification illustrated, three separate inlets are provided for hydrogen, and each inlet enters into a horizontally segmented portion of the reactor space. These segments are partitioned from each other by means of annular flanges 42 extending outwardly from the top of one or more of the outer baffles 16 to the sidewalls 2 of the reactor. These annular partitions minimize the mixing of hydrogen injected through the respective inlets 36, 38 and 40, thus permitting convenient temperature control at all levels in the reactor. Ordinarily, it is preferred to maintain a substantially isothermal temperature profile down the reactor, and the hydrocracking or hydrogenation reactions being exothermic, progressively cooler hydrogen will be injected through inlet conduits 36, 38 and 40 respectively.

As the hydrogen sweeps radially inwardly across catalyst bed 14, gasoline product vapors, volatile decomposition products such as ammonia and hydrogen sulfide, are continuously swept inwardly and enter center-pipe 20, and thence flow upwardly into interspace 6 (FIGURES 1 and 3), where the product vapors mingle with the vapor phase portion of fresh feed which was admitted via inlet conduit 4. The combined mixture then passes upwardly through perforated plate 8 and through upper catalyst bed 44, where additional conversion of vapor phase fresh feed and unconverted vapor phase from catalyst bed 14 takes place. The process conditions of temperature and space velocity can be varied independently in upper bed 44 so as to minimize overcracking of gasoline product vapors from lower catalyst bed 14, while still obtaining a substantial conversion of hydrocarbons boiling above the gasoline range. The combined vapor phase product from catalyst bed 44 is withdrawn from upper outlet conduit 46, and sent to conventional condensation and fractionation equipment not shown for recovery of gasoline and unconverted oil, the latter being recycled if desired to inlet conduit 4.

Figure 3:
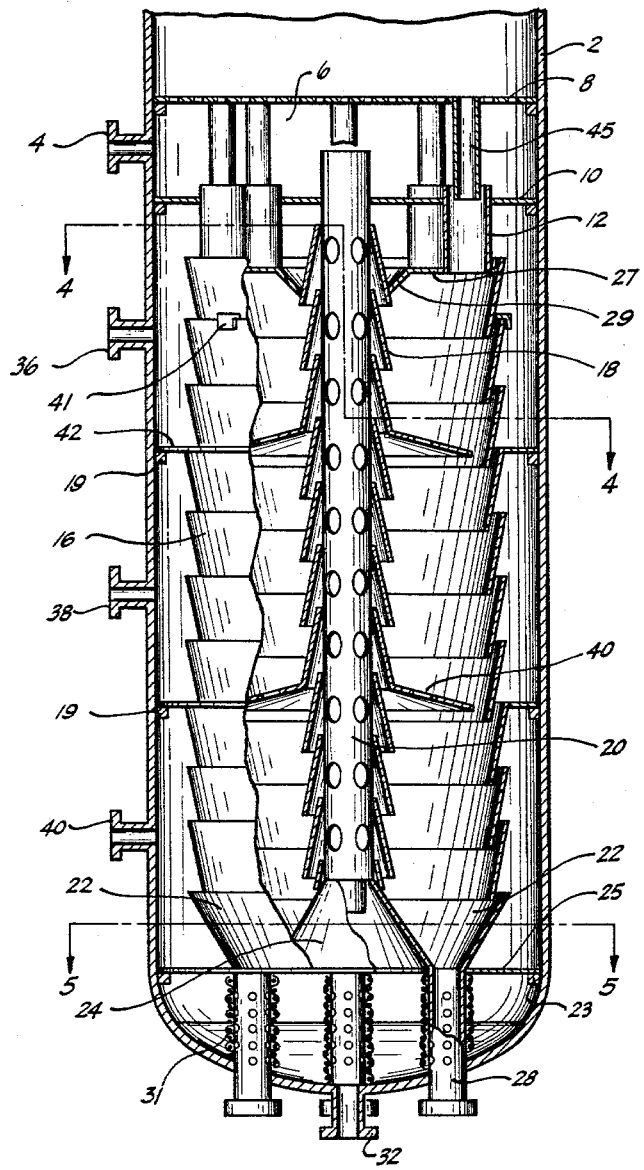
FIGURE 3 is a detailed vertical cross-section of the lower portion of the reactor illustrated in FIGURE 1 with some of the internal elements in partial elevation.

FIGURE 3 shows more particularly the manner in which outer baffles 16 are supported in the reactor. Primary support is provided by annular flanges 42 and ring 25, which rest upon supporting lugs 19 and 23, attached to the walls of the reactor. Intermediate support is provided by a series of baffle lugs 41, (only two of which are shown), each baffle 16 thus supporting its superimposed baffle.

One other apparatus feature to be noted consists of a plurality of optional downcomers 45, depending from perforated plate 8, and terminating concentrically in each sealing leg 12. These are provided as a means for draining catalyst bed 44 downwardly when bed 14 is drained through standpipes 28. Thus, the entire catalyst charge can be drained and replaced, or if desired bed 14 can be drained and replaced with the catalyst from bed 44.

Reference is now made to FIGURE 2 which illustrates a modified version of the apparatus of FIGURE 1, designed to further minimize overcracking of gasoline vapors in upper catalyst bed 44. In this modification, the center-pipe 20 does not open into interspace 6, but is extended horizontally to emerge peripherally from the side of the reactor. With this modification, the gasoline synthesized in catalyst bed 14 does not contact upper bed 44, but as shown, the entire lower bed effluent is transferred via line 48 and condenser 50 to gas-liquid separator 52. Recycle hydrogen is withdrawn via line 54, and liquid condensate comprising gasoline and unconverted gas oil is withdrawn via line 56 and transferred to fractionating column 58, from which the product gasoline is taken overhead via line 60, and unconverted light gas oil is withdrawn as bottoms via line 62 and recycled to the reactor via feed inlet line 4 and preheater 64. Since all of the hydrogen required in upper bed 44 is added to the feed mixture in line 4, most of the recycle light gas oil, as well as the light gas oil portion of the fresh feed, will be vaporized in interspace 6, and pass upwardly through catalyst bed 44 for conversion to gasoline. The vapor phase effluent from bed 44 is then withdrawn via line 46 and blended with the bed 14 effluent in line 48 for product and recycle oil recovery as described. Unconverted heavy gas oil from lower catalyst bed 14 is withdrawn via line 32, and may be utilized as diesel fuel, or recycled via line 66 and 62 for further conversion to gasoline and light gas oil.

The mode of operation shown in FIGURE 2 is especially advantageous in that the vapor phase feed which goes into upper catalyst 44 is initially substantially free of gasoline vapors, and is also free of ammonia and hydrogen sulfide, thus permitting the use of lower and more selective conversion temperatures in bed 44.

The process conditions in lower catalyst bed 14 (FIGURES 1 or 2) are suitably adjusted so as to provide about 40–100% conversion to gasoline, or other desired product, per pass, based on the liquid phase portion of feed which is fed thereto. At the 100% conversion level, there will of course be no unconverted liquid to be withdrawn via line 32. In upper catalyst bed 44, the process conditions are suitably adjusted so as to provide about 20–70% conversion to gasoline per pass, based on the total vapor phase portion of unconverted oil which is fed thereto.

In each catalyst bed, it is preferred to adjust the operating conditions, principally temperature, so as to permit relatively long runs between regenerations, e.g., from about 2–8 months. For these purposes, it will be understood that pressures in the high ranges will normally be used in connection with temperatures in the high range, while the lower operative pressures will normally be used in conjunction with the lower temperatures. The range of practical hydrocracking conditions contemplated are as follows:

HYDROCRACKING CONDITIONS

|  | Operative | Preferred |
|---|---|---|
| Temperature, °F | 400–850 | 500–750 |
| Pressure, p.s.i.g | 400–3,000 | 800–2,000 |
| LHSV, v./v./hr | 0.5–10 | 0.7–5 |
| $H_2$/oil ratio, s.c.f./b | 500–20,000 | 1,000–10,000 |

Those skilled in the art will readily understand that when ranges of operating conditions are specified as above, a large number of determinative factors are involved. Thus, highly active catalysts, or fresh catalysts at the beginning of a run, will be used in conjunction with lower temperatures than will less active or partially deactivated catalysts. The lower limit of pressure to be utilized in a given operation will normally depend upon the desired run length. Lower pressures, generally result in a more rapid deactivation of the catalyst, and hence where extremely long run lengths are desired, pressures of above about 1,000 p.s.i.g. are mandatory. However, economically feasible run lengths are normally obtainable with most catalysts and feedstocks within the 600–2,000 p.s.i.g. pressure range.

The hydrocracking feedstocks which may be treated herein include in general any mineral oil fraction having an initial boiling point above the conventional gasoline range, i.e., above about 400° F., and having an end-boiling-point of up to about 1,000° F. This includes straight-run gas oils, coker distillate gas oils, deasphalted crude oils, cycle oils derived from catalytic or thermal cracking operations and the like. These fractions may be derived from petroleum crude oils, shale oils, tar sand oils, coal hydrogenation products and the like. Specifically, it is preferred to employ feedstocks boiling between about 400° and 900° F., having an API gravity of 15° to 35°, and containing at least about 20% by volume of acid-soluble components (aromatics+olefins). Such oils may also contain from about 0.1% to 5% of sulfur and from about 0.01% to 2% by weight of nitrogen.

Where the nitrogen content of the feed is greater than about 0.05% by weight, it is normally preferable to subject the feed to a pre-hydrofining teratment to reduce the nitrogen content to below 0.05%. It is to be noted however that this preferred maximum nitrogen level is higher than the practical maximum which can be tolerated in a conventional concurrent or countercurrent flow hydrocracking operation. This factor is of considerable economic importance, because hydrofining becomes an expensive, low-space-velocity operation when it is necessary to reduce the nitrogen content to below about 0.001% as required for conventional hydrocracking operations.

Hydrogenation feedstocks may comprise any of the foregoing hydrocracking feeds, and in addition many other aromatic concentrates as, e.g., naphthalene or methyl naphthalene fractions.

It should be noted further that the process of this invention is especially amenable to the treatment of feedstocks boiling predominantly in the 550–900° F. range. The process is primarily directed to the treatment of feedstocks which (1) contain a substantial proportion of heavy materials boiling above about 650° F., and (2) contain less than about 30% by volume of light components in the 400–600° F. range.

The hydrocracking catalyst to be employed in the hydrocracking beds described above may consist of any desired combination of a refractory cracking base with a suitable hydrogenating component. Suitable cracking bases include for example mixtures of two or more difficultly reducible oxides such as silica-alumina, silica-magnesia, silica-zirconia, alumina-boria, silica-titania, silica-zirconia-titania, acid treated clays and the like. Acidic metal phosphates such as aluminum phosphate may also be used. The preferred cracking bases comprise composites of silica and alumina containing about 50–90% silica; coprecipitated composites of silica, titania and zirconia containing between 5% and 75% of each component; partially dehydrated, zeolitic, crystalline molecular sieves, e.g., of the "X" or "Y" crystal types, having relatively uniform pore diameters of about 8 to 14 Angstroms, and comprising silica, alumina and one or more exchangeable zeolitic cations.

A particularly active and useful class of molecular sieve cracking bases are those having a relatively high $SiO_2/Al_2O_3$ ratio, e.g., between about 2.5 and 6.0. The most active forms are those wherein the exchangeable zeolitic cations are hydrogen and/or a divalent metal such as magnesium, calcium or zinc. In particular, the "Y" molecular sieves, wherein the $SiO_2/Al_2O_3$ ratio is about 5, are preferred, either in their hydrogen form, or a divalent metal form. Normally, such molecular sieves are prepared first in the sodium or potassium form, and the monovalent metal is ion-exchanged out with a divalent metal, or where the hydrogen form is desired, with an ammonium salt followed by heating to decompose the zeolitic ammonium ion and leave a hydrogen ion. It is not necessary to exchange out all of the monovalent metal; the final compositions may contain up to about 6% by weight of $Na_2O$, or equivalent amounts of other monovalent metals. Molecular sieves of this nature are described more particularly in Belgian Patents Nos. 577,642, 598,582, 598,683, and 598,682.

As in the case of the X molecular sieves, the Y sieves also contain pores of relatively uniform diameter in the individual crystals. In the case of X sieves, the pore diameters may range between about 6 and 14 A., depending upon the metal ions present, and this is likewise the case in the Y sieves, although the latter usually are found to have crystal pores of about 9 to 10 A. in diameter.

The foregoing cracking bases are compounded, as by impregnation, with from about 0.5% to 25% (based on free metal) of a Group VIB or Group VIII metal promoter, e.g., an oxide or sulfide of chromium, tungsten, cobalt, nickel, or the corresponding free metals, or any combination thereof. Alternatively, even smaller proportions, between about 0.05 and 2% of the metals platinum, palladium, rhodium or iridium may be employed. The oxides and sulfides of other transitional metals may also be used, but to less advantage than the foregoing.

In the case of zeolitic type cracking bases, it is desirable to deposit the hydrogenating metal thereon by ion-exchange. This can be accomplished by digesting the zeolite, preferably in its ammonium form, with an aqueous solution of a suitable compound of the desired metal, wherein the metal is present in a cationic form, and then reducing to form the free metal, as described for example in Belgian Patent No. 598,686.

A particularly suitable class of hydrocracking catalysts for treating nitrogen-containing feedstocks is composed of about 75–95% by weight of a coprecipitated hydrocracking base containing 5–75% $SiO_2$, 5–75% $ZrO_2$, and 5–75% $TiO_2$, and incorporated therein from about 5–25%, based on free metal, of a Group VIII metal or metal sulfide, e.g., nickel or nickel sulfide.

The following example is cited to illustrate a typical modification of the process, but is not intended to be limiting in scope.

*Example*

The raw feedstock is a 400–860° F. boiling range coker gas oil containing 2% of sulfur and 0.3% nitrogen by weight, and having an API gravity of 22°. This raw feed is first subjected to catalytic hydrofining over a 4% cobalt sulfide-16% molybdenum sulfide on alumina catalyst, at 1.5 LHSV, 1,500 p.s.i.g. and 700° F., to reduce the nitrogen content to about 0.02%. The hydrofined oil is then fed to a hydrocracking unit similar to that of FIGURE 1, wherein both catalyst beds consist of a magnesium "Y" molecular sieve containing about 3% by weight of zeolitic magnesium, and loaded with 0.5% by weight of palladium. The operating conditions are as follows:

TABLE 1

| Operating Conditions | Upper Catalyst Bed 44 | Lower Catalyst Bed 14 |
|---|---|---|
| LHSV [a] | 2.0 | 1.5 |
| Pressure, p.s.i.g. | 1,520 | 1,530 |
| Temperature, ° F. | 700 | 620 |
| $H_2$/oil ratio, s.c.f./B [a] | 6,000 | 6,000 |
| Conversion to 400° F. end-point gasoline, vol. percent per pass [b] | 50 | 70 |

[a] Based on total oil going to the respective hydrocracking zone.
[b] Based on unconverted oil going to the respective hydrocracking zone.

On the basis of an operation utilizing 10,000 barrels per day of initial feed, and with total recycle of unconverted oil to the hydrocracker, the approximate yields are as follows for the combined hydrofining-hydrocracking operation:

TABLE 2

Conversion to gasoline and lighter __ 100 vol. percent.
$C_1$–$C_3$ dry gas _____ 100 s.c.f./b. feed.
Liquid products:
    Butanes _____ 1,200 b./d.
    $C_5$–$C_6$ _____ 2,400 b./d.
    $C_7$–400° F. gasoline _____ 8,900 b./d.
    Total liquid products _____ 12,500 b./d.
    Chemical hydrogen consumption _____ 2,800 s.c.f./b. feed.

The foregoing example is based on total effluent from lower catalyst bed 14 being passed through upper bed 44, and only about 1,000 s.c.f. of hydrogen per barrel of feed being added in admixture with the feed at inlet conduit 4. All the remaining hydrogen is added at inlets 36, 38 and 40.

When this operation is modified as shown in FIGURE 2, with the effluent from bed 14 being separately withdrawn, and all the hydrogen requirement for bed 44 added with the feed via inlet 4, a substantial improvement in cracking efficiency is obtained. The $C_1$–$C_3$ dry gas and butane makes are reduced by about 10–15%, higher liquid yields are obtained, and hydrogen consumption is reduced by about 10–15%.

Results analogous to those indicated in the foregoing example are obtained when other hydrocracking catalysts, feedstocks and conditions within the broad purview of the above disclosure are employed. It is hence not intended to limit the invention to the details of the example or the drawings, but only broadly as defined in the following claims.

I claim:

1. A process for effecting hydrogenation of a liquid hydrocarbon feedstock with continuous removal of volatile hydrogenation products, which comprises, passing said feedstock downwardly through a vertically elongated bed of granular hydrogenation catalyst under hydrogenation conditions of temperature and pressure, separately permeating a stream of hydrogen substantially uniformly through one lateral surface of said catalyst bed and flowing the same across said bed in direct contact with catalyst and in a direction transverse to the flow of liquid feedstock therein, and withdrawing a gas phase comprising hydrogen and volatile hydrogenation products substantially uniformly from an opposite lateral surface area of said catalyst bed.

2. A process as defined in claim 1 wherein said volatile hydrogenation products comprise a catalyst poison from the class consisting of hydrogen sulfide and ammonia.

3. A process as defined in claim 1 wherein said hydrogenation catalyst is a hydrocracking catalyst, and said volatile hydrogenation products comprise a desired low-boiling hydrocarbon fraction.

4. A process as defined in claim 1 wherein said hydrogenation catalyst is a hydrocracking catalyst, and said volatile hydrogenation products comprise gasoline and a catalyst poison from the class consisting of hydrogen sulfide and ammonia.

5. A process as defined in claim 1 wherein the mean flow path of liquid feedstock through said catalyst bed is at least twice the length of the mean flow path of the hydrogen flowing transversely therethrough.

6. A process as defined in claim 1 wherein said transverse flow of hydrogen across said catalyst bed is in a direction substantially perpendicular to the downward flow of feedstock therein.

7. A catalytic hydrocracking process for converting a hydrocarbon feedstock boiling above the gasoline range to gasoline-boiling-range hydrocarbons which comprises:
  (a) passing said feedstock in liquid phase downwardly through a vertically elongated bed of granular hydrocracking catalyst under hydrocracking conditions of temperature and pressure,
  (b) separately permeating a hydrogen-rich gas substantially uniformly through one lateral surface of said catalyst bed and flowing the same across said bed in direct contact with catalyst and in a direction transverse to the flow of said liquid feedstock therein,
  (c) withdrawing a vapor phase effluent comprising hydrogen and gasoline-boiling-range hydrocarbons substantially uniformly from an opposite lateral surface area of said catalyst bed, and
  (d) withdrawing unconverted liquid phase hydrocarbons from the lower end of said catalyst bed.

8. A process as defined in claim 7 wherein said vapor phase effluent also comprises unconverted hydrocarbons boiling above the gasoline range, and wherein said vapor phase effluent is passed axially through a separate bed of hydrocracking catalyst under separately controlled hydrocracking conditions to effect further conversion of said unconverted hydrocarbons to gasoline-boiling-range hydrocarbons.

9. A process as defined in claim 7 wherein said vapor phase effluent also comprises unconverted hydrocarbons boiling above the gasoline range, and comprising the further steps of,
  (e) cooling, condensing and fractionating said vapor phase effluent to recover a hydrogen-rich recycle gas, a gasoline product fraction and an unconverted recycle oil,
  (f) blending said unconverted recycle oil with hydrogen and said feedstock,
  (g) subjecting the resulting mixture to phase separation at substantially hydrocracking conditions of temperature and pressure, thus forming a vapor phase mixture of hydrogen and relatively light feed hydrocarbons and a liquid phase comprising relatively heavy feed hydrocarbons,
  (h) passing said liquid phase downwardly through the hydrocracking catalyst bed as defined in step (a), and
  (i) passing said vapor phase mixture axially through a separate bed of hydrocracking catalyst under separately controlled hydrocracking conditions to effect conversion of said relatively light feed hydrocarbons to gasoline-boiling-range hydrocarbons.

10. A process as defined in claim 7 wherein said feedstock comprises organic nitrogen compounds, and wherein said vapor phase effluent comprises ammonia formed by the decomposition of said organic nitrogen compounds.

11. A process as defined in claim 7 wherein said unconverted liquid phase is recycled for further conversion as defined in step (a).

12. A process as defined in claim 7 wherein said hydrocracking catalyst is a zeolitic alumino silicate molecular sieve having a $SiO_2/Al_2O_3$ mole-ratio between about 2.5 and 6, containing zeolitic cations from the class consisting of hydrogen and divalent metals, and deposited thereon a minor proportion of a Group VIII noble metal.

13. A process for effecting hydrogenation of a liquid hydrocarbon feedstock with continuous removal of volatile hydrogenation products, which comprises, passing said feedstock into the top of, and downwardly through, an elongated bed of granular hydrogenation catalyst in the shape of a vertical cylindrical annulus, under hydrogenation conditions of temperature and pressure, separately permeating a stream of hydrogen substantially uniformly through the outer cylindrical boundary of said catalyst bed and flowing the same across said bed in direct contact with catalyst and in a direction transverse to the flow of liquid feedstock therein, and withdrawing a gas phase comprising hydrogen and volatile hydrogenation products substantially uniformly from the inner cylindrical boundary of said catalyst bed.

14. An apparatus for effecting cross-flow hydrogenation of liquid hydrocarbons comprising in combination:
  (a) an outer cylindrical, pressure-retaining vessel;
  (b) a series of inverted outer frusto-conical baffles supported coaxially within said outer vessel and vertically spaced from each other in overlapping fashion so as to provide an inwardly sloping fluid inlet annulus between adjacent baffles, and forming an outer catalyst-retaining structure;
  (c) a series of upright inner frusto-conical baffles of smaller base diameter than said outer baffles, supported coaxially within said outer vessel and vertically spaced from each other in overlapping fashion so as to provide an outwardly sloping fluid outlet annulus between adjacent baffles, and forming an inner catalyst-retaining member;
  (d) catalyst supporting means positioned below the lowermost of said inner and outer baffles;
  (e) a fluid outlet conduit communicating with the axial interior channel formed by said inner frusto-conical baffles;
  (f) liquid delivery means adapted to deliver liquid feed to the upper portion of the annular space included between said inner and outer frusto-conical baffles;
  (g) gas delivery means adapted to deliver hydrogen to the outer annulus included between said outer vessel and said outer frusto-conical baffles;
  (h) a plurality of vertical standpipes supported below said catalyst supporting means and opening upwardly into the annular space between said outer catalyst-returning structure and said inner catalyst-retaining member, and extending downwardly through the lower shell section of said outer pressure-retaining vessel, said standpipes being perforated over at least a portion of their length included between said catalyst supporting means and said lower shell section so as to retain catalyst therein but permit the egress of liquid therefrom; and
  (i) a liquid outlet means traversing said lower shell section and adapted to deliver accumulated liquid from the lower interior of said pressure-retaining vessel to the exterior.

15. An apparatus as defined in claim 12 including in addition at least one relatively flat, perforated upright frusto-conical baffle supported coaxially from one of said inner baffles and sloping downwardly and outwardly and terminating near the inner circumference of said outer baffles, and adapted to redirect downflowing liquid outwardly, away from said inner baffles.

16. An apparatus as defined in claim 14 including in addition at least one annular ring positioned horizontally in the outer annulus included between said outer vessel and one of said outer frusto-conical baffles, and forming a partition dividing said outer annulus into an upper section and a lower section, and separate gas delivery means for said upper section and said lower section.

17. An apparatus as defined in claim 14 including in addition an upper catalyst chamber positioned above the topmost of said inner and outer baffles, said fluid outlet conduit (e) communicating with the lower portion of said upper catalyst chamber.

References Cited by the Examiner

UNITED STATES PATENTS

| | | | |
|---|---|---|---|
| 2,303,118 | 11/42 | Fry | 208—143 |
| 2,363,738 | 11/44 | Mather et al. | 23—288 |
| 2,429,980 | 11/47 | Allinson | 23—288.3 |
| 2,458,357 | 1/49 | Evans | 23—288.3 |
| 2,662,846 | 12/53 | Montgomery et al. | 208—108 |
| 2,918,425 | 12/59 | Berger et al. | 208—108 |
| 2,934,492 | 4/60 | Hemminger et al. | 208—112 |
| 2,983,670 | 5/61 | Seubold | 208—110 |
| 2,993,855 | 7/61 | Fear | 208—213 |
| 2,997,374 | 8/61 | Lavender et al. | 23—288 |
| 3,008,895 | 11/61 | Hansford et al. | 208—112 |

ALPHONSO D. SULLIVAN, *Primary Examiner.*